United States Patent
Bohm et al.

(10) Patent No.: US 7,480,753 B2
(45) Date of Patent: Jan. 20, 2009

(54) SWITCHING UPSTREAM AND DOWNSTREAM LOGIC BETWEEN PORTS IN A UNIVERSAL SERIAL BUS HUB

(75) Inventors: Mark R. Bohm, Village of Bear Creek, TX (US); Donald L. Perkins, Austin, TX (US); Carl J. Crawford, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 186 days.

(21) Appl. No.: 11/412,431

(22) Filed: Apr. 27, 2006

(65) Prior Publication Data

US 2007/0255885 A1     Nov. 1, 2007

(51) Int. Cl.
*G06F 13/00* (2006.01)
(52) U.S. Cl. ..................... 710/104; 710/313
(58) Field of Classification Search .............. 710/316, 710/313, 314, 104; 709/217–223
See application file for complete search history.

(56) References Cited

U.S. PATENT DOCUMENTS

| | | | |
|---|---|---|---|
| 5,784,581 A | 7/1998 | Hannah | |
| 5,815,167 A | 9/1998 | Muthal et al. | |
| 5,890,015 A | 3/1999 | Garney et al. | |
| 5,953,511 A | 9/1999 | Sescila, III et al. | |
| 5,978,389 A | 11/1999 | Chen | |
| 6,119,196 A | 9/2000 | Muller et al. | |
| 6,141,719 A | 10/2000 | Rafferty et al. | |
| 6,145,045 A | 11/2000 | Falik et al. | |
| 6,185,641 B1 | 2/2001 | Dunnihoo | |
| 6,205,501 B1 | 3/2001 | Brief et al. | |

(Continued)

FOREIGN PATENT DOCUMENTS

DE     298 06 131     7/1998

(Continued)

OTHER PUBLICATIONS

"A novel series dynamic voltage restorer for distributed systems" by Fang et al. (abstract only) Publication Date: 18-21 Aug. 1998.*

(Continued)

*Primary Examiner*—Glenn A Auve
(74) *Attorney, Agent, or Firm*—Meyertons Hood Kivlin Kowert & Goetzel, P.C.; Jeffrey C. Hood

(57) ABSTRACT

System and method for switching logic in a Universal Serial Bus hub. The USB hub may include upstream logic and downstream logic for sending and receiving information from a host controller and a USB device respectively. The USB hub may include a plurality of ports operable to couple to a plurality of devices, including a first port coupled to the upstream logic and a second port coupled to the downstream logic. The USB hub may also include switching logic operable to switch the upstream and the downstream logic with respect to the first port and the second port respectively. The switching logic may switch the upstream and downstream logic by decoupling the first port from the upstream logic, decoupling the second port from the downstream logic, and coupling the second port to the upstream logic. Additionally, the first port may be coupled to the downstream logic.

35 Claims, 5 Drawing Sheets

U.S. PATENT DOCUMENTS

| | | | |
|---|---|---|---|
| 6,279,060 B1 | 8/2001 | Luke et al. | |
| 6,304,995 B1 | 10/2001 | Smith et al. | |
| 6,308,239 B1 | 10/2001 | Osakada et al. | |
| 6,324,605 B1 | 11/2001 | Rafferty et al. | |
| 6,435,904 B1 | 8/2002 | Herbst et al. | |
| 6,480,927 B1 | 11/2002 | Bauman | |
| 6,505,267 B2 | 1/2003 | Luke et al. | |
| 6,532,512 B1 | 3/2003 | Torii et al. | |
| 6,564,275 B1 | 5/2003 | Chen | |
| 6,600,739 B1 | 7/2003 | Evans et al. | |
| 6,601,146 B2 | 7/2003 | Auslander et al. | |
| 6,622,195 B2 | 9/2003 | Osakada et al. | |
| 6,671,765 B1 | 12/2003 | Karlsson et al. | |
| 6,678,760 B2 | 1/2004 | Brief | |
| 6,725,302 B1 | 4/2004 | Benayoun et al. | |
| 6,732,218 B2 | 5/2004 | Overtoom et al. | |
| 6,775,733 B2 | 8/2004 | Chang et al. | |
| 6,816,929 B2 | 11/2004 | Ueda | |
| 6,959,355 B2 | 10/2005 | Szabelski | |
| 6,993,620 B2 | 1/2006 | Ferguson | |
| 7,024,501 B1 | 4/2006 | Wright | |
| 7,028,114 B1 | 4/2006 | Milan et al. | |
| 7,028,133 B1 | 4/2006 | Jackson | |
| 7,152,190 B2 * | 12/2006 | Overtoom | 714/44 |
| 7,275,885 B2 * | 10/2007 | Byun | 401/280 |
| 7,281,330 B2 * | 10/2007 | Silverbrook et al. | 29/890.1 |
| 7,290,852 B2 * | 11/2007 | Jackson Pulver et al. | 347/40 |
| 7,293,129 B2 * | 11/2007 | Johnsen et al. | 710/313 |
| 7,314,261 B2 * | 1/2008 | Jackson Pulver et al. | 347/9 |
| 2002/0154625 A1 | 10/2002 | Ma | |
| 2003/0142683 A1 | 7/2003 | Lam et al. | |
| 2004/0019732 A1 * | 1/2004 | Overtoom et al. | 710/313 |
| 2004/0088449 A1 | 5/2004 | Sakaki | |
| 2004/0111544 A1 | 6/2004 | Bennett et al. | |
| 2004/0153597 A1 | 8/2004 | Kanai et al. | |
| 2004/0168001 A1 | 8/2004 | Szabelski | |
| 2004/0168009 A1 | 8/2004 | Szabelski et al. | |
| 2004/0225808 A1 | 11/2004 | Govindaraman | |
| 2005/0060636 A1 | 3/2005 | Mathe | |
| 2006/0020737 A1 | 1/2006 | Szabelski | |
| 2006/0056401 A1 | 3/2006 | Bohm et al. | |
| 2006/0059293 A1 | 3/2006 | Wurzburg et al. | |
| 2006/0179144 A1 | 8/2006 | Nagase | |
| 2006/0227759 A1 | 10/2006 | Bohm et al. | |
| 2007/0255885 A1 * | 11/2007 | Bohm et al. | 710/316 |
| 2008/0005262 A1 * | 1/2008 | Wurzburg et al. | 709/217 |

FOREIGN PATENT DOCUMENTS

| | | | |
|---|---|---|---|
| EP | 0 982 663 A2 | 3/2000 | |
| GB | 2 352 540 A | 1/2001 | |
| JP | 2000-242377 | 9/2000 | |
| JP | 2001-043178 | 2/2001 | |
| JP | 2001229119 | 8/2001 | |
| JP | 2003-195991 | 7/2003 | |
| KR | 10-2004-0008365 A | 1/2004 | |
| KR | 2005-0077106 | 1/2004 | |
| KR | 2005-0026011 | 3/2005 | |
| KR | 10-0490068 B1 | 5/2005 | |
| KR | 20050077106 | 8/2005 | |

OTHER PUBLICATIONS

"On-The-Go Supplement to the USB 2.0 Specification—Revision 1.2"; Apr. 4, 2006; 81 pages.

"On-The-Go Supplement to the USB 2.0 Specification—Revision 1.0"; Dec. 18, 2001; 74 pages.

"Programmable Multi-Host Device Sharing USB Hub"; Research Disclosure; Feb. 1, 1999; 1 page; IBM Corp.; Mason Publications; Hampshire, GB.

Fred Zlotnick;"NLAS4717 Analog Switch Permits USB 1.1 Switching"; ON Semiconductor;May 2004; 4 pages.

"FSUSB11 Low Power High Bandwidth USB Switch Dual SPDT Multiplexer/Demultiplexer"; Fairchild Semiconductor; Apr. 2004 (Revised Jul. 2004); 7 pages.

"FSUSB11 Low Power Full Speed USB (12Mbps) Switch"; Fairchild Semiconductor; Apr. 2004 (Revised Jul. 2005); 9 pages.

"FSUSB22 Low Power 2 Port Hi-Speed USB 2.0 (480 Mbps) Switch"; Fairchild Semiconductor; Jan. 2005 (Revised Jun. 2005); 11 pages.

"USB 1.1 Switch Offers Low Power and Bandwidth"; Electronic Design; Jul./Aug. 2004; 3 pages.

"TetraHub High-speed USB Hub Controller"; Publication No. CY7C6540; Dec. 5, 2002; 25 pages; Cypress Semiconductor Corporation.

"Universal Serial Bus Specification, Revision 2.0"; Chapter 11: Hub Specification; Apr. 27, 2000; pp. 297-437; Compaq, Hewlett-Packard, Intel, Lucent, Microsoft, NEC, Philips.

"USB hub"; from Wikipedia, the free encyclopedia (http://en.wikipedia.org?wiki/USB_hub); 2 pages.

"USB Hub in a Nutshell"; Beyond Logic; Jun. 15, 2005 (Copyright 2001-2005); 5 pages; Chapter 1.

"USB MulitSwitch Hub"; SMSC Datasheet; Jun. 17, 2006: 57 pages; Standard Microsystems Corp., Hauppauge, NY.

"USB2.0 Compatible 4-Port Switching Hub with Two Upstream Host Ports"; SMSC Datasheet; Nov. 8, 2005; 26 pages; Standard Microsystems Corp., Hauppauge, NY.

Korean Office Action for application No. 2007-0038292, dated Apr. 21, 2008, eighteen pages.

Computer-generated translation of JP2001229119A Publication, "Device Selection Hubbox By Plural Computers", by Hitachi Ltd., published Aug. 24, 2001, 21 pages.

Human-generated translation of JP2001229119A Publication, "Device Selection Hubbox By Plural Computers", by Hitachi Ltd., published Aug. 24, 2001, 2 pages.

USB2524 USB MultiSwitch Hub, http://www.smsc.com/main/catalog/usb2524.html, accessed Nov. 26, 2007 (4 pages).

"SMSC Introduces Industry's First USB Sharing Hub," networking news, http://home.nestor.minsk.by/networks/news/2006/04/1706.html, accessed Nov. 26, 2007 (2 pages).

Miller, Matthew, "USB hub chip accepts hospitality of two hosts" http://www.edn.com/index.asp?layout=article&articleid=CA6325520&industryid=2573, Apr. 17, 2006, accessed Nov. 26, 2007 (5 pages).

* cited by examiner

SWITCHING UPSTREAM AND DOWNSTREAM LOGIC BETWEEN PORTS IN A UNIVERSAL SERIAL BUS HUB

FIELD OF THE INVENTION

The present invention relates to the field of Universal Serial Bus (USB) hubs and more particularly to a system and method for reversing logic in USB hubs.

DESCRIPTION OF THE RELATED ART

In recent years, the electronics marketplace has seen a proliferation of Universal Serial Bus (USB) electronics and devices. These devices and electronics have given the common user access to a plethora of devices, e.g., that connect to a computer, including, as an exemplary list, keyboards, mice, audio devices, digital cameras, digital video-recorders, cell phones, digital music players, power supplies, storage devices, recording equipment, and signal converters, among others. Because of the widespread use of USB electronics and methods, direct communication between devices, without the need of a host computer, has been implemented using the USB 2.0 On-The-Go (OTG) specification. However, when two USB devices communicate using the OTG specification, a first device must act as a host controller and the other device must act as a USB (peripheral) device. Because OTG devices have this dual-role capability, an ambiguity as to which device will act as the host controller results. For example, it may be desirable for a given device, e.g., a cell phone, to be a host in one situation, e.g., printing a picture taken on the cell phone, and a peripheral in another, e.g., downloading music from a host computer. To deal with this issue, the OTG supplement has defined a host negotiation protocol (HNP) as well as a default configuration based on the connecting cable, i.e., the connecting pins of the cable designates a default host and peripheral device.

However, the OTG supplement does not define a protocol for using dual-role devices in a USB hub, i.e., circuitry that allows USB communication among multiple devices. USB hubs, in general, have upstream logic associated with a port for communicating with a host or host controller, and downstream logics associated with ports for communicating with a plurality of USB devices. One prior art approach allows one of the USB devices to act as a host to the previous host controller (now acting as a device). However, this method does not allow dual-role devices to act as hosts to the other devices connected to the hub. In other words, the USB hub becomes a two-way communication path between the new host and the old host, and ignores communication to the other connected devices.

Thus, improved systems and methods for device communications in USB hubs are desirable.

SUMMARY OF THE INVENTION

Various embodiments of a system and method for reversing logic in USB hubs are presented herein.

According to one embodiment of the present invention, a USB hub may include upstream logic for sending and receiving information to and from a host controller, downstream logic for sending and receiving information to and from a USB device, a plurality of ports each operable to couple to upstream or downstream logic and one or more USB devices, and switching logic operable to switch upstream and downstream logic between a first port and a second port. In some embodiments, input may be received to the USB hub specifying a change in control of one or more devices coupled to the USB hub by a first device, e.g., coupled to a first port, to control by a second device, e.g., coupled to a second port. For example, if one of the devices is an on-the-go (OTG) or dual-role device, it may request, or be instructed, to act as the host controller of the USB hub. In this example, the input may be received from any of a variety of sources, and may set or invoke a switching condition, which may then be detected by the USB hub.

In some embodiments, the switching condition may be invoked mechanically, such as, for example, by flipping, i.e., switching on or off, a mechanical switch on the USB hub, or, alternatively, if the USB hub is included in a device, a switch on the device. In one embodiment, the switching condition may include a change in orientation of the connecting cables. More specifically, in the current USB OTG specification, the USB connecting cable may have a default host controller connection (on one end) and a default device connection (on the other end). In this case, the switching condition may be invoked by reversing these two connections, e.g., via the change in pins associated with each of the connectors on each end of the cable may invoke the switching condition.

Alternatively, or additionally, a user or other system may invoke the switching condition via electronic means; for example, the user may choose from a plurality of possible buttons or options, e.g., depending on the number of devices coupled to the USB hub. For example, if the USB hub is included in a peripheral device, e.g., a cell phone, PDA, and/or a digital music player, among others, the user may be presented with a plurality of options on the display of the peripheral device and may invoke the switching condition by selecting one or more of the available options. More specifically, the peripheral device may include a menu associated with the USB hub; the user may select this menu, e.g., via a stylus, voice activation, and/or a keypad, among others means, and select from one or more options to invoke a specific change in host, e.g., by invoking the switching condition. Alternatively, the user may invoke the switching condition, e.g., similar to methods described above, among others, from a device coupled to the USB hub.

In some embodiments, the USB hub may automatically detect the switching condition. For example, the USB hub may have a sensing mechanism, e.g., present in the physical layer (PHY) of connections to the USB hub, specifically for detecting the switching condition. In one embodiment, the switching condition may include a change of impedance in one or more pins of one of the connections to the USB hub, e.g., one or more of the ports. For example, in one embodiment, the invoked switching condition, e.g., via the means described above, may include a change in impedance on the D+ and D– pins of the USB cable, e.g., connected to the peripheral device that is requesting logic reversal. As a specific example, normally two of the pins in the PHY may have an impedance of 15 kOhms, and after tying, for example, two pins together, the impedance may decrease to 7.5 kOhms. Correspondingly, the USB hub may detect this change in impedance as the switching condition. Thus, the USB hub may receive input invoking a switching condition indicating a change in logic in the hub.

It should be noted that in various embodiments where there are a plurality of upstream logics with associated host controllers, the input may also specify which of the coupled devices are to be controlled by the second device. In other words, as indicated above, the USB hub may have a plurality of host controllers, each controlling a respective subset of the coupled devices, possibly overlapping, and the input may specify that one or more of the coupled devices become host controllers for controlling other coupled devices, possibly including the old host controllers. In some embodiments, the input may specify a change in subsets of devices that are controlled by the new host controllers. Said another way, the input may specify that control of the plurality of coupled devices be changed to a new set of host controllers, and each of the new and/or old host controllers may control a new respective subset of the coupled devices.

Note that the input, the methods, and the switching conditions described herein may also apply to the above description regarding the multiple host controllers. For example, the input may be received mechanically, e.g., similar to above, via a switch, but in this case, the switch may have a plurality of options each associated with the new and old host controller(s) and the new controlled subset(s) of the coupled devices. Alternatively, or additionally, the input may be received electronically using the menus and methods described above. Note further that the above described switching conditions, and invoking thereof, are exemplary only and that other methods and switching conditions are envisioned. Thus, the USB hub may receive input specifying a change in control of the plurality of devices coupled to the USB hub from one or more host controllers to one or more other host controllers, e.g., previously acting as peripheral devices.

In one embodiment, the upstream logic included in the USB hub may be switched from receiving information from the first port, i.e., coupled to the old host controller, to receiving information from the second port, i.e., coupled to the new host controller. In other words, the USB hub may change control of the devices coupled to the hub from one device to another in response to the received input, e.g., the inputs described above. In one embodiment, the hub may perform this change by decoupling the first port from the upstream logic, decoupling the second port from the downstream logic, and coupling the second port to the upstream logic. In some embodiments, the hub may also allow the old host controller to act as a peripheral device to the new host controller; in other words, the hub may couple the downstream logic, e.g., the downstream logic that was used by the second port, to the first port. Thus, the upstream and downstream logic may be effectively switched between a host controller and a device. Correspondingly, in various embodiments, the new host controller may act as host to other devices, e.g., possibly including the old host controller, coupled to the hub, e.g., each with associated downstream logic.

It should be noted that the above described switching is not limited to any particular two ports included in the hub, and, in fact, any of a plurality of logics associated with various ports may be switched according to methods described above, among others. Thus, in one embodiment, any downstream logic, upstream logic, and/or other logics included in the USB hub may be switched.

Thus, using the methods described herein, the USB hub may switch the upstream and downstream logic(s) according to the received input.

BRIEF DESCRIPTION OF THE DRAWINGS

A better understanding of the present invention can be obtained when the following detailed description of the preferred embodiment is considered in conjunction with the following drawings, in which.

Figure 1:
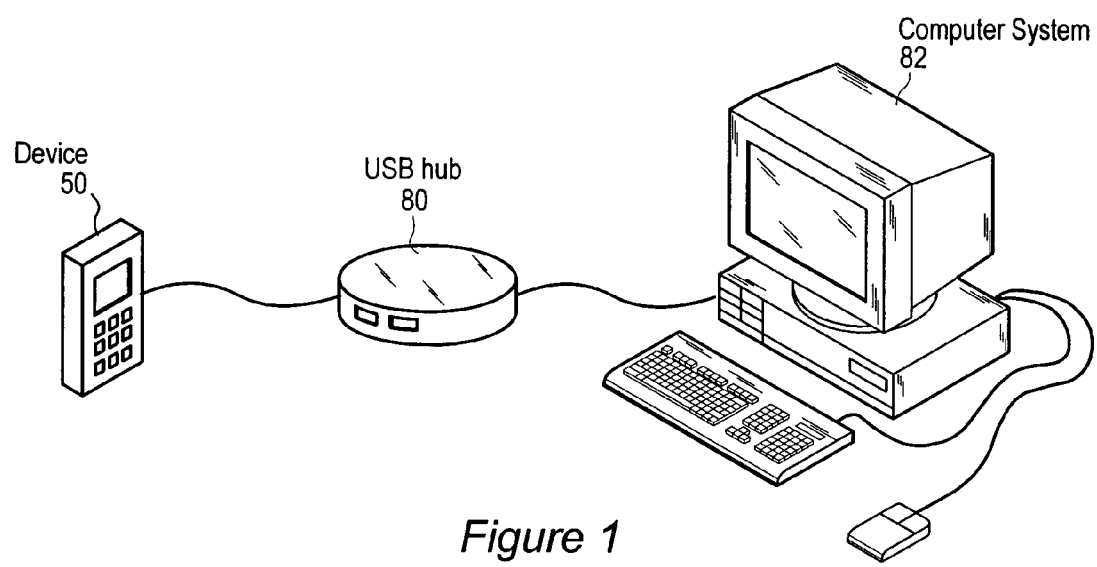
FIGS. 1 and 2 illustrate exemplary systems suitable for implementing various embodiments of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. patent application Ser. No. 10/940,406, titled "Universal Serial Bus Switching Hub," filed Sep. 14, 2004, whose inventors are Henry Wurzburg, James E. Bowles, Robert E. Hollingsworth, Mark R. Bohm, and Drew J. Dutton; and U.S. patent application Ser. No. 11/100,299, titled "Peripheral Sharing USB Hub," filed Mar. 6, 2005, whose inventors are Mark R. Bohm, Mark Fu, Henry Wurzburg, James E. Bowles, Robert E. Hollingsworth and Drew J. Dutton.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Figure 2:
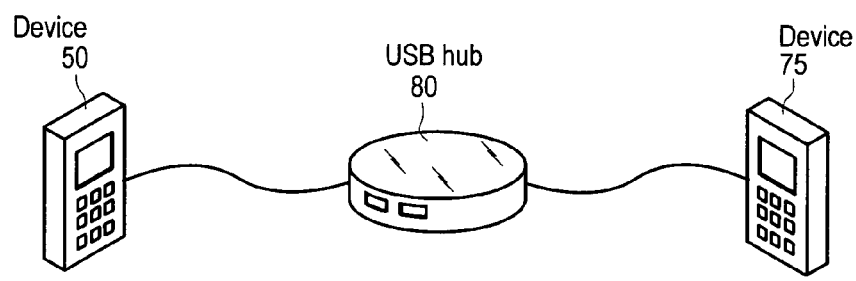

FIGS. 1 and 2—Exemplary USB Systems

FIG. 1 illustrates an exemplary system suitable for implementing various embodiments of the current invention. As shown, a device, e.g., device 50, may be coupled to a Universal Serial Bus (USB) hub, e.g., USB hub 80, which may in turn be coupled to a host computer system, e.g., computer system 82. In some embodiments, the device and/or the computer system may be coupled to each other, e.g., via the hub, via a network. For example, the computer system 82 and/or the device 50 may be at remote location(s) and may couple to the USB hub 80 via a network, e.g., an intranet network, a wide-area network (WAN), the Internet, etc.

The device 50 may be any of numerous devices capable of USB communication; for example, the device 50 may be or include a personal digital assistant (PDA), a portable digital music player, e.g., an IPOD™ as provided by Apple Computer Corporation, a cell phone, a printer, a digital camera, a video player, an audio device, a recording device, e.g., a digital voice recorder, a personal video recorder (PVR), a set-top box, an uninterrupted power supply (UPS), a mass-storage device, e.g., a hard drive, a zip drive, etc., a memory medium, e.g., flash memory, a thumb drive, etc., a keyboard, a mouse, a joystick, a communication device, e.g., a Bluetooth device, an Ethernet device, etc., a communication converter device, e.g., for converting signal formats, an additional USB hub, a computer system, and a monitor, among others. In preferred embodiments, the device may be a dual-role device, e.g., a USB OTG device. Note that the above list of devices and types of devices is exemplary only, and that other devices are also envisioned.

Additionally, the computer system 82 may be any of various computer types. For example, the computer system 82 include at least one memory medium on which one or more computer programs or software components may be stored. The memory medium may also store operating system software, as well as other software for operation of the computer system. Various embodiments further include receiving or storing instructions and/or data implemented in accordance with the foregoing description upon a carrier medium. As shown, the computer system 82 may include one or more coupled input devices, e.g., a keyboard and mouse, as well as other input devices, and a display device for displaying graphics associated with software components executing on the computer system 82.

In various embodiments, the USB hub 80 may be any of various hubs. For example, the USB hub 80 may be an external hub, e.g., one whereby a host, such as the device 50 and/or the computer system 82, may control one or more other devices coupled to the hub. In one embodiment, the USB hub 80 may be a root hub. Additionally, or alternatively, the USB hub 80 may be included in the device 50 or the computer system 82. For example, the device may connect directly to a hub included in the computer system 82. Additionally, or alternatively, the device may itself include a USB hub for connecting to other USB devices, e.g., the computer system 82 or a hub in each of the device 50 and the computer system 82. In one embodiment, the USB hub may include or be a portion of a USB composite or compound device, e.g., similar to above where the USB hub 80 may be included in the device or computer system. Exemplary USB hubs and systems will be described in more detail below.

FIG. 2 illustrates another exemplary system suitable for implementing various embodiments of the current invention. As shown in FIG. 2, the device 50 may be coupled to the USB hub 80, which may in turn be coupled to another device, e.g., device 75. Similar to above, the USB hub may be included in one or both of the device 50 and the device 75, i.e., one of the devices may include the USB hub, and the other device may also include a similar USB hub; additionally, the device 75 may be or include any of the above enumerated devices capable of USB communication, among others.

Furthermore, in one embodiment, the device 75 and the USB hub 80 may be internal to the device 50. For example, the device 50 may be a peripheral device such as a cell phone, a PDA, and/or a portable music player, among others, that includes the USB hub 80 for communication with internal and external devices. The cell phone, for example, may have any of numerous internal devices that may be coupled to the USB hub such as a camera, a hard drive or another memory medium, a Bluetooth device, a digital music file player, or any of various appropriate devices such as those described above, among others. Following this example, the cell phone may couple to an external system, such as a PDA, and an internal device, such as a digital camera, via the USB hub housed inside of the cell phone. Note that the above-described system(s) are exemplary only, and other devices and systems are envisioned such as those described herein, among others.

Figure 3:
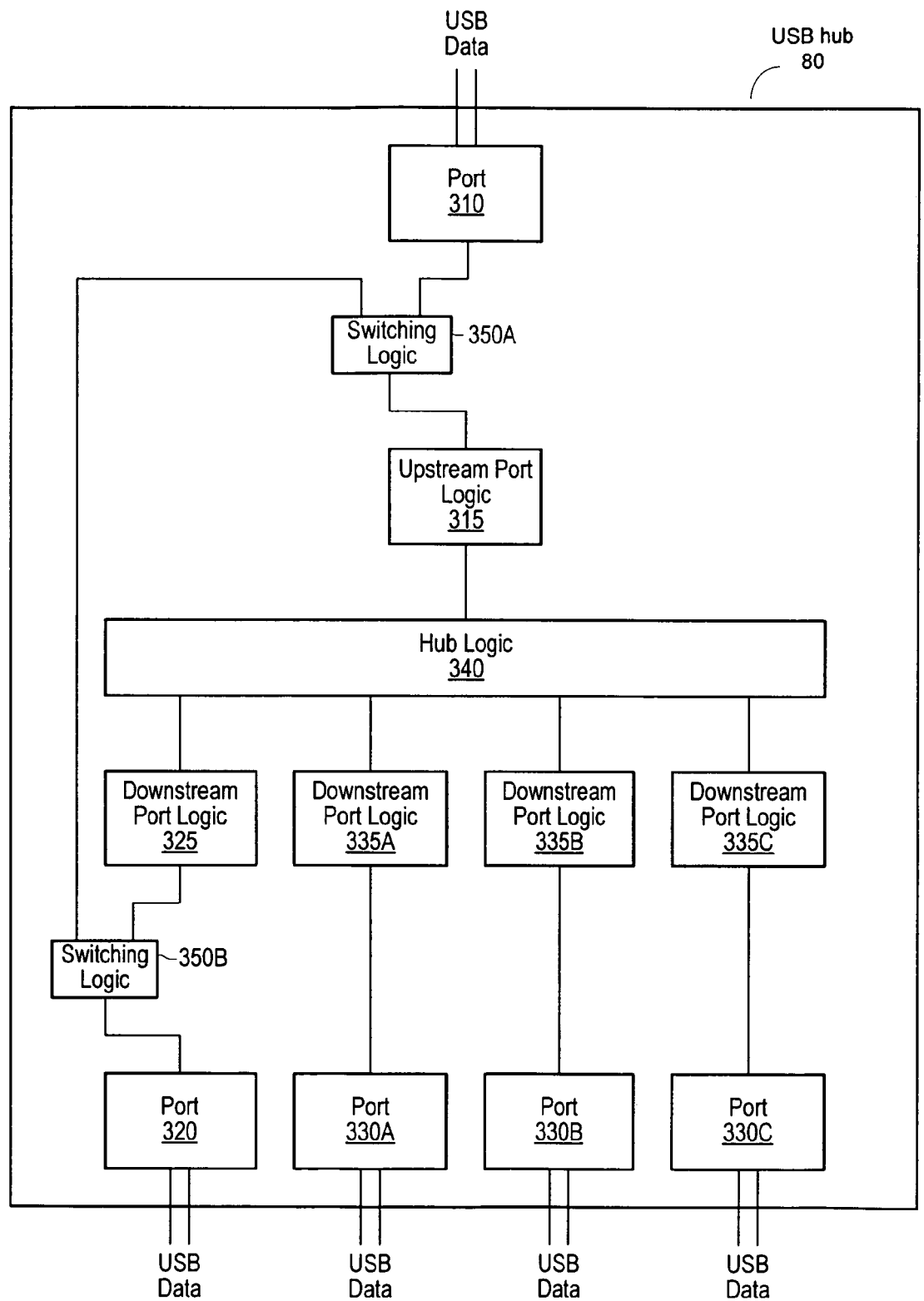
FIG. 3 is an exemplary block diagram illustrating one embodiment of a USB hub.

FIG. 3—Exemplary USB Hub

FIG. 3 illustrates a block diagram of an exemplary USB hub, e.g., the USB hub 80, according to one embodiment of the present invention. In some embodiments, peripheral device(s) may couple to the USB hub through interface(s). For example, the USB hub may include physical (PHY) interfaces, and/or other interfaces, e.g. USB 2.0 Transceiver Macrocell Interface (UTMI) or UTMI+ Low Pin Interface (ULPI), among others. In one embodiment, the USB hub may include a plurality of ports, e.g., ports 310, 320, 330A, 330B, and 330C as shown in FIG. 3, for coupling to one or more devices, e.g., the device 50, the device 75, and/or other device(s), e.g., using the interfaces described above, among others. Each port may be coupled to logic for interpreting and transmitting signals to and from the devices. For example, a host controller may be coupled to upstream logic, e.g., upstream port logic 315, which may be operable to transmit and receive information specific to devices acting as hosts. Conversely, a device may be coupled to downstream logic, e.g., downstream port logics 325, 335A, 335B, and 335C, which may be operable to transmit and receive information specific to devices acting as peripheral devices. It should be noted that the hub may include one or more of each of these logics, among others. For example, in one embodiment, the USB hub may have a plurality of upstream logics associated with one or more host controllers, each of which may have separate or overlapping control over the USB devices coupled to the USB hub. Additionally, as indicated above, the USB hub may have a plurality of downstream logics associated with one or more peripheral devices.

Furthermore, in some embodiments, the USB hub may include hub logic, e.g., hub logic 340, for receiving, transmitting, and interpreting information to and from at least one host controller and the devices. For example, the hub logic 340 may be operable to intelligently route information from the host controller to the appropriate target device and vice-versa; additionally, the hub logic may be operable to resolve signal conflicts and collisions, e.g., signals sent from multiple devices at substantially the same time. In one embodiment, the USB hub may include one or more switches and/or switching logic(s), e.g., switching logics 350A and 350B, operable to couple and/or switch upstream or downstream logics associated with two or more devices as will be described in more detail below. Note that the switching logic may be separated into multiple components, such as, for example, the two components shown in FIG. 3, or combined into a single switching logic component. Alternatively, the switching logic may be stored in a memory medium and/or distributed throughout the USB hub. Note that, as shown in FIG. 3, the switching logic may be associated with a first port, e.g., the port 310, and a second port, e.g., the port 320; however, this configuration is exemplary only, and, in fact, other systems and designs are contemplated. For example, the switching logic may be associated with any or all of the ports included in the USB hub thus allowing any of the included logics to be switched, e.g., during operation.

As an example, in some embodiments, the USB hub may include a first port coupled to a host controller with associated upstream logic and a second port coupled to a USB device with associated downstream logic. As indicated above, there may be one or more additional devices coupled to one or more additional ports included in the USB hub. Thus, the host controller may control a plurality of USB devices, e.g., by using the hub logic described above. If one of the USB devices is a dual-role device, it may request or be requested to become the host controller of the hub, e.g., to control the other USB devices coupled to the USB hub as described below.

Figure 4:
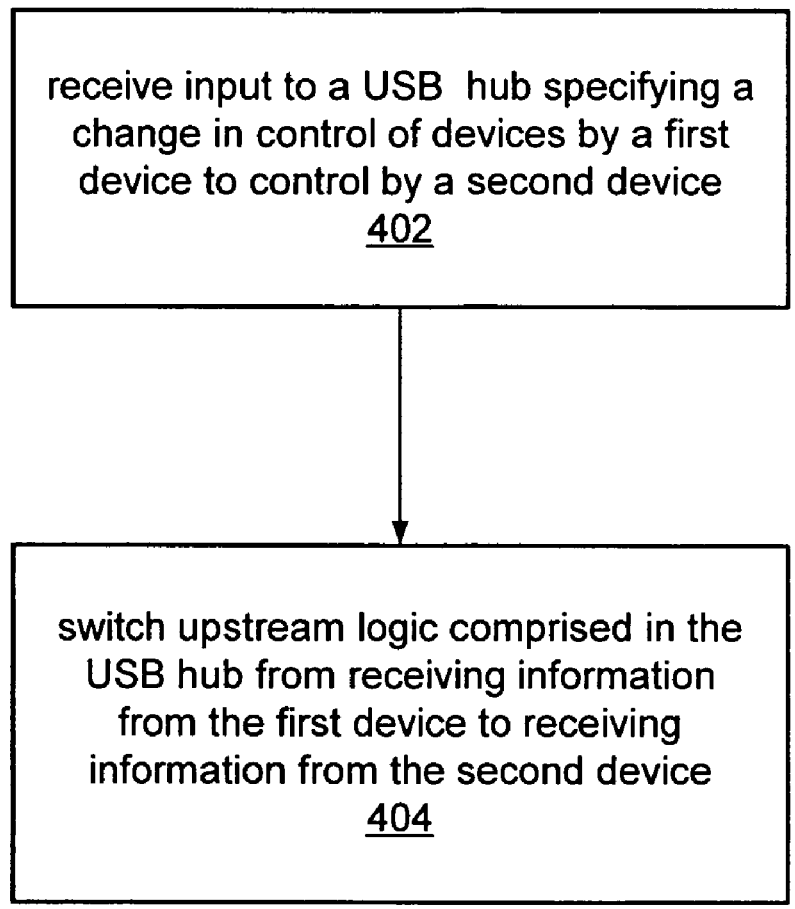
FIG. 4 is a flowchart diagram illustrating one embodiment of a method for switching logic in a USB Hub, according to one embodiment of the invention.

FIG. 4—Exemplary Method for Switching Logic in a USB Hub

FIG. 4 illustrates an exemplary method for switching logic in a USB hub, such as the USB hub of FIG. 3. The method shown in FIG. 4 may be used in conjunction with any of the computer systems or devices described herein, among others. In various embodiments, some of the method elements shown may be performed concurrently, in a different order than shown, or may be omitted. Additional method elements may also be performed as desired. As shown, this method may operate as follows.

In 402, input may be received to the USB hub, e.g., USB hub 80, specifying a change in control of one or more devices coupled to the USB hub 80 (e.g., via ports 330A-330C) by a first device, e.g., coupled to the first port 310, to control by a second device, e.g., coupled to the second port 320. For example, following the descriptions above, if one of the devices is an OTG or dual-role device, it may request, or be instructed, to act as the host controller of the USB hub. In this example, the input may be received from any of a variety of sources, and may set or invoke a switching condition, which may then be detected by the USB hub.

In some embodiments, the switching condition may be invoked mechanically, such as, for example, by flipping, i.e., switching on or off, a mechanical switch on the USB hub, or, alternatively, if the USB hub is included in a device, a switch on the device. In one embodiment, the switching condition may include a change in orientation of the connecting cables. More specifically, as indicated above, in the current USB OTG specification, the USB connecting cable may have a default host controller connection (on one end) and a default device connection (on the other end). In this case, the switching condition may be invoked by reversing these two connections, e.g., via the change in pins associated with each of the connectors on each end of the cable may invoke the switching condition.

Alternatively, or additionally, a user or other system may invoke the switching condition via electronic means; for example, the user may choose from a plurality of possible buttons or options, e.g., depending on the number of devices coupled to the USB hub. For example, if the USB hub is included in a peripheral device, e.g., a cell phone, PDA, and/or a digital music player, among others, the user may be presented with a plurality of options on the display of the peripheral device and may invoke the switching condition by selecting one or more of the available options. More specifically, the peripheral device may include a menu associated with the USB hub; the user may select this menu, e.g., via a stylus, voice activation, and/or a keypad, among others means, and select from one or more options to invoke a specific change in host, e.g., by invoking the switching condition. Alternatively, the user may invoke the switching condition, e.g., similar to methods described above, among others, from a device coupled to the USB hub.

In some embodiments, the USB hub may automatically detect the switching condition. For example, the USB hub may have a sensing mechanism, e.g., present in the physical layer (PHY) of connections to the USB hub, specifically for detecting the switching condition. In one embodiment, the switching condition may include a change of impedance in one or more pins of one of the connections to the USB hub, e.g., one or more of the ports. For example, in one embodiment, the invoked switching condition, e.g., via the means described above, may include a change in impedance on the D+ and D− pins of the USB cable, e.g., connected to the peripheral device that is requesting logic reversal. As a specific example, normally two of the pins in the PHY may have an impedance of 15 kOhms, and after tying, for example, two pins together, the impedance may decrease to 7.5 kOhms. Correspondingly, the USB hub may detect this change in impedance as the switching condition. Thus, the USB hub may receive input invoking a switching condition indicating a change in logic in the hub.

It should be noted that in various embodiments where there are a plurality of upstream logics with associated host controllers, the input may also specify which of the coupled devices are to be controlled by the second device. In other words, as indicated above, the USB hub may have a plurality of host controllers, each controlling a respective subset of the coupled devices, possibly overlapping, and the input may specify that one or more of the coupled devices become host controllers for controlling other coupled devices, possibly including the old host controllers. In some embodiments, the input may specify a change in subsets of devices that are controlled by the new host controllers. Said another way, the input may specify that control of the plurality of coupled devices be changed to a new set of host controllers, and each of the new and/or old host controllers may control a new respective subset of the coupled devices.

For example, the USB hub may first include two host controllers, such as a computer and a PDA, and a plurality of peripheral devices, such as a cell phone, a printer, and a digital camera. In this example, the computer may control the printer and the cell phone, and the PDA may control the digital camera. Subsequently, the USB hub may receive input specifying that the cell phone become a new host controller, e.g., taking the place of the PDA, e.g., in order to print a picture. In this case, the input may specify that the new host controller, i.e., the cell phone, control the printer and the digital camera, and that the computer control the PDA. Thus, the input may specify a change in control from one or more host controllers, in this case, the. PDA, to one or more of the peripheral devices, in this case, the cell phone. Additionally, the input may specify a new control set for each of the new controllers, e.g., the cell phone controlling the printer and the digital camera, and the computer controlling the PDA.

As a simple example, the USB hub may couple to a host controller and a plurality of USB devices, e.g., a dual-role digital music player device controlling a dual-role PDA, a keyboard, and a digital video recorder. In this example, the USB hub may receive input specifying that upstream logic for controlling the keyboard be coupled to the PDA, and that the digital music player continue to control the digital video recorder coupled to the USB hub. Thus, in some embodiments, the input may specify that the original host controller may control a new subset of the coupled devices, e.g., only the digital video recorder, and the new host controller control another subset, e.g., the keyboard.

Note that the input, the methods, and the switching conditions described herein may also apply to the above descriptions regarding the multiple host controllers. For example, the input may be received mechanically, e.g., similar to above, via a switch, but in this case, the switch may have a plurality of options each associated with the new and old host controller(s) and the new controlled subset(s) of the coupled devices. Alternatively, or additionally, the input may be received electronically using the menus and methods described above. Note further that the above described switching conditions, and invoking thereof, are exemplary only and that other methods and switching conditions are envisioned. Thus, the USB hub may receive input specifying a change in control of the plurality of devices coupled to the USB hub from one or more host controllers to one or more other host controllers, e.g., previously acting as peripheral devices.

In 404, the upstream logic included in the USB hub may be switched from receiving information from the first port, i.e., coupled to the old host controller, to receiving information from the second port, i.e., coupled to the new host controller. In other words, the USB hub may change control of the devices coupled to the hub from one device to another in response to the received input, e.g., the inputs described above. In one embodiment, the hub may perform this change by decoupling the first port from the upstream logic, decoupling the second port from the downstream logic, and coupling the second port to the upstream logic. In some embodiments, the hub may also allow the old host controller to act as a peripheral device to the new host controller; in other words, the hub may couple the downstream logic, e.g., the downstream logic that was used by the second port, to the first port. Thus, the upstream and downstream logic may be effectively switched between a host controller and a device. Correspondingly, in various embodiments, the new host controller may act as host to other devices, e.g., possibly including the old host controller, coupled to the hub, e.g., each with associated downstream logic. Further examples of this switching will be described in more detail below.

It should be noted that the above described switching is not limited to any particular two ports included in the hub, and, in fact, any of a plurality of logics associated with various ports may be switched according to methods described above, among others. Thus, in one embodiment, any downstream logic may be switched with any upstream logic and/or other logics included in the USB hub.

Following the example above regarding the computer, the PDA, and the cell phone, the USB hub may switch the upstream and downstream logic associated with the PDA and the cell phone respectively. The USB hub may also switch the control of the peripherals, e.g., the printer being controlled by the computer to being controlled by the cell phone, by rerouting the signals from the upstream logic of the computer to the upstream logic of the cell phone. In other words, the downstream logic associated with the printer may be switched from receiving signals from the computer to receiving signals from the cell phone. Thus, after the logic is switched, the cell phone may control the printer and the digital camera, and the computer may control the PDA. Further details regarding the changing of controlled subsets of devices in USB hubs can be found in U.S. application Ser. Nos. 10/940,406 and 11/100, 299 which were incorporated by reference above.

Thus, using the methods described herein, the USB hub may switch the upstream and downstream logic(s) according to the received input.

Figure 5:
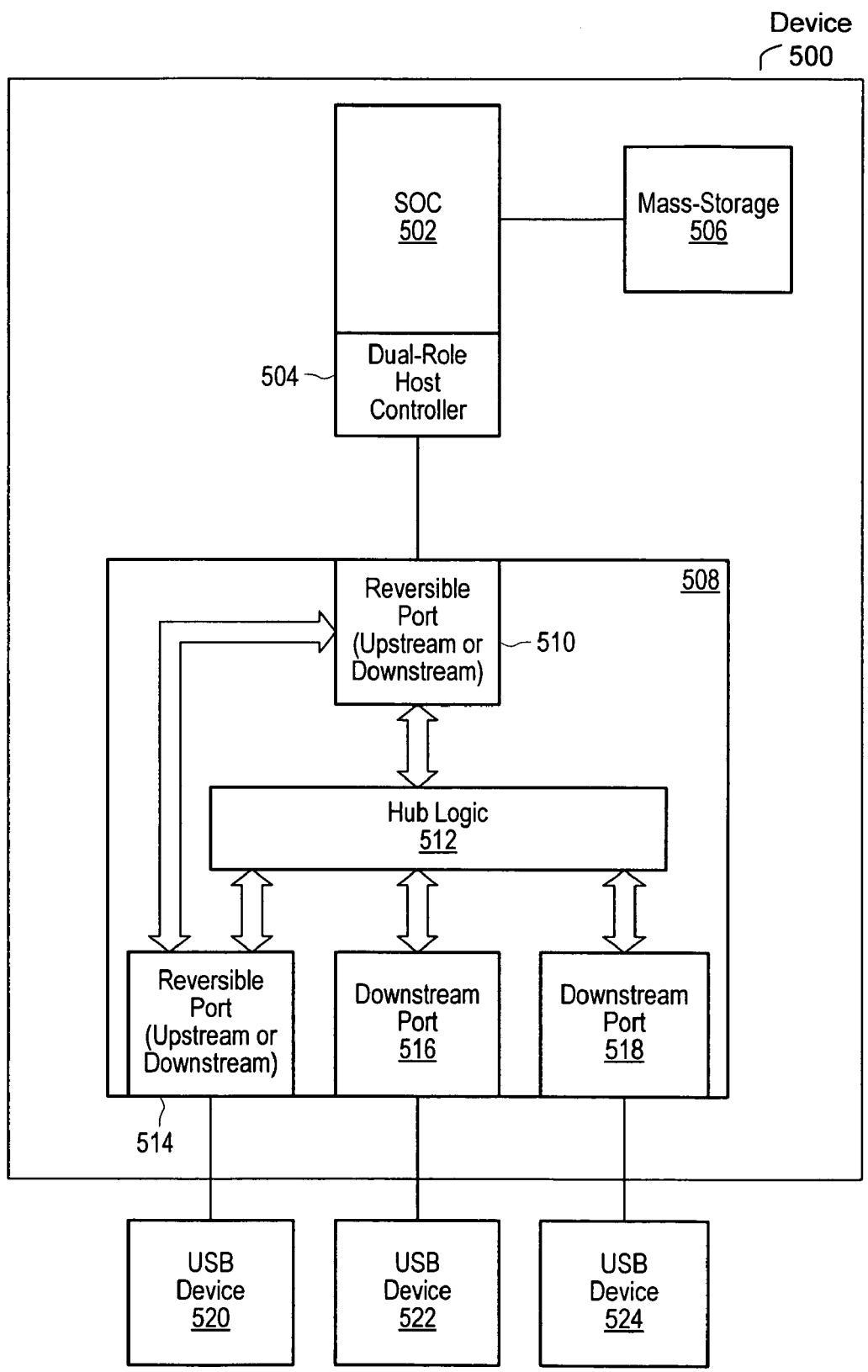
FIG. 5 is an exemplary block diagram illustrating one embodiment of a USB hub included in a USB device.
Figure 6:
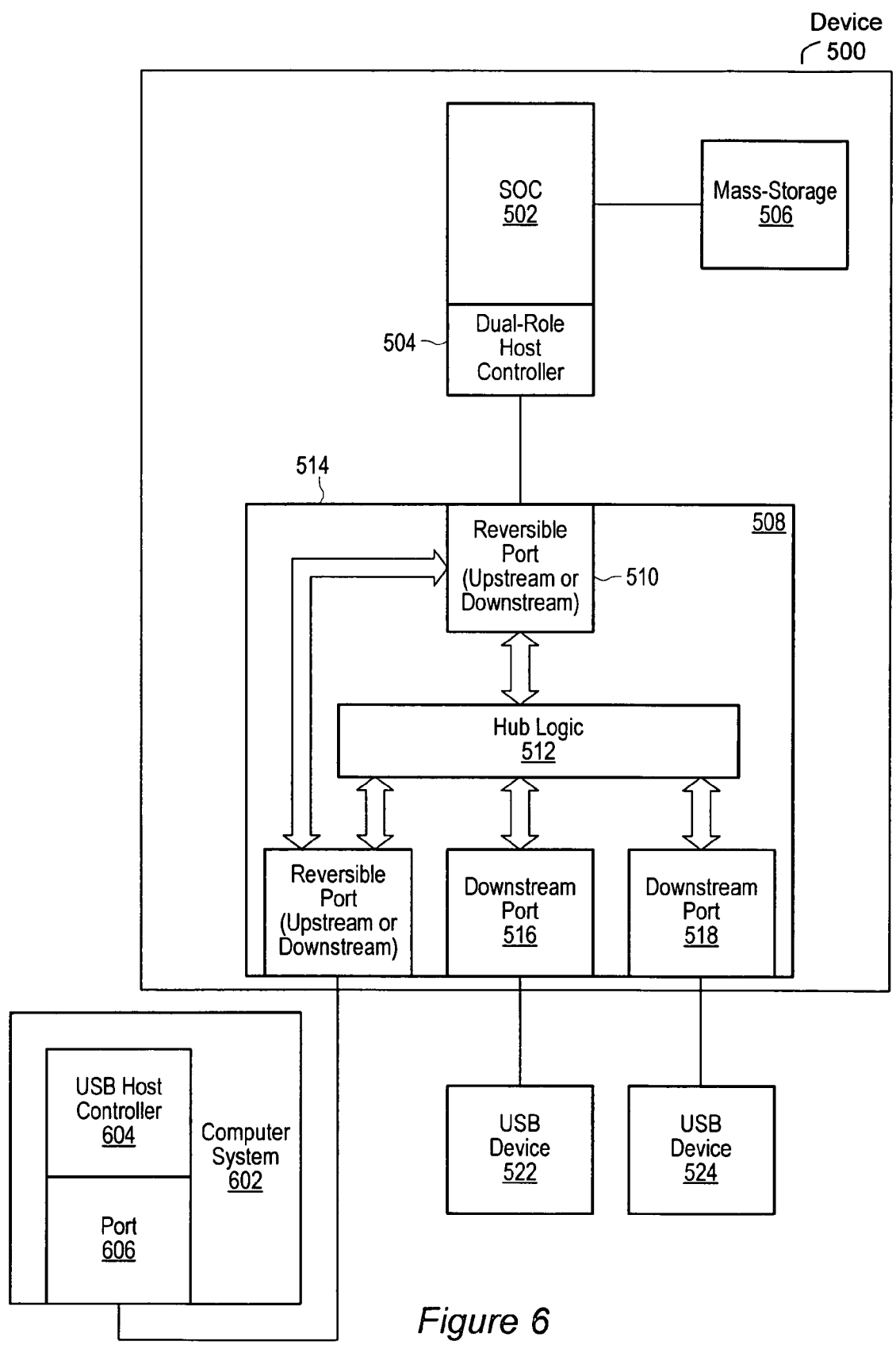
FIG. 6 is an exemplary block diagram illustrating one embodiment of a USB hub included in a USB device which is coupled to a computer system.

FIGS. 5 and 6—Exemplary USB Hub Included in a USB Device

FIGS. 5 and 6 illustrate exemplary block diagrams of a USB hub included in a USB device, e.g., device 500. The device may be or include any of the above-described devices, e.g., as described with respect to the above described Figures, among others. Similar to above, the USB hub 508 may include a plurality of ports, e.g., reversible ports 510 and 514 and downstream ports 516 and 518, for coupling to at least one host controller and one or more peripheral devices. As also described above, the coupled devices may be internal or external to the USB device. The USB device may include logic for controlling devices and for acting as a peripheral device, e.g., dual-role host controller block 504, which may be coupled to or included in a system-on-a-chip (SoC) 502 that controls the peripheral device. In some embodiments, the peripheral device may include a mass-storage device, e.g., mass-storage 506, e.g., a hard drive, for storing information. As shown, the mass storage device may be coupled to the SoC 502 outside of the USB hub 508; alternatively, the mass storage device may be coupled to the USB hub as an internal or external device, e.g., USB device 520, 522, or 524. Furthermore, similar to above, the USB hub may include hub logic 512, e.g., for routing signals between the host controller and the coupled devices.

As also shown, the USB hub may reverse at least two of the ports, e.g., reversible ports 510 and 514, e.g., using switching logic methods and conditions described above, among others. Note that, this particular system is exemplary only, and, in fact, further embodiments are envisioned where any of the ports included in the USB hub may be reversible.

FIG. 6 illustrates the USB device, e.g., the device 500, coupled to a computer system, e.g., computer system 602, e.g., similar to the computer system 82 described above. The computer system may include a USB host controller, e.g., USB host controller 604, for managing and/or communicating with devices (e.g., USB devices 522 and 524) coupled to the computer system. The computer system may also include a port for coupling to other USB devices, e.g., port 606. Thus, as shown, the computer system may couple to the peripheral device via the USB hub and may alternate as host controller of the coupled devices and device with the host controller included in the peripheral device. In other words, the computer system and/or the SoC 502 may control respective subsets (or all) of the devices coupled to the USB hub. In one embodiment, the computer system may act as a host, and may control the mass storage device via the SoC. In other words, the computer system may control the mass storage device by sending commands through the SoC. In one embodiment, the SoC may interpret the commands and send corresponding commands to the mass storage device for the computer system. In embodiments where the mass storage device is coupled to the USB hub directly, the computer system may control the mass storage device without using the SoC.

As an example, the peripheral device may be a cell phone including an associated hard drive, e.g., the mass storage device 506 as well as a digital camera and a Bluetooth device. The cell phone may have a USB port for coupling to other devices, in this case, the computer system. Thus, when the SoC acts as the host controller of the USB hub, the cell phone may control each of the coupled devices and communicate information to the host computer as a host controller. Upon receiving input specifying a change in control, the USB hub may switch respective upstream and downstream logics associated with the cell phone and the host computer. Subsequently, the host computer may control respective devices in the cell phone. For example, the host computer may update files on the hard drive, e.g., via the SoC, take pictures using the digital camera, and communicate using the Bluetooth device. Alternatively, as described above, the host controller may control a subset of these devices, and the SoC may continue to control another subset.

Thus, using the systems and methods described herein, a USB hub may change control of a plurality of coupled devices from a first device acting as a host controller to a second device, which was previously a peripheral device.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A serial bus hub, comprising:
a plurality of upstream logics, each for sending and receiving information to and from a respective host controller;
a plurality of downstream logics each for sending and receiving information to and from a respective serial bus device;
a plurality of ports, wherein a first plurality of ports is each configured to couple to respective host controller, and wherein a second plurality of ports is each configured to couple to respective peripheral devices;
wherein the serial bus hub is configurable to allow a first upstream logic to connect to any of various subsets of the plurality of downstream logics and a second upstream logic to connect to any of various subsets of the plurality of downstream logics;
wherein the plurality of ports comprise a first port of the plurality of ports coupled to the first upstream logic, and a second port of the plurality of ports coupled to a first downstream logic;
wherein the serial bus hub is configurable to switch the first upstream logic and the first downstream logic with respect to the first port and the second port, respectively.

2. The serial bus hub of claim 1,
wherein to switch the upstream and downstream logics, the serial bus hub is configurable to decouple the first port from the first upstream logic, decouple the second port from the first downstream logic, and couple the second port to the first upstream logic.

3. The serial bus hub of claim 2,
wherein to switch the upstream and downstream logics, the serial bus hub is further configured to couple the first port to the downstream logic.

4. The serial bus hub of claim 1, wherein the serial bus hub is further configured to:
automatically detect a switching condition with respect to the first upstream logic and/or the second downstream logic; and
switch the first upstream logic and/or the first downstream logic in response to the automatic detection.

5. The serial bus hub of claim 4,
wherein the automatic detection is based on a change in impedance at one or more of the plurality of ports.

6. The serial bus hub of claim 1, wherein the serial bus hub is configured to switch the upstream logic and/or the downstream logic in response to a user invoked switching condition.

7. The serial bus hub of claim 1,
wherein after the first upstream logic is switched from the first port to the second port, a device coupled to the second port is configured to control other serial bus devices coupled to respective other ports of the serial bus hub, wherein each of respective other ports is coupled to respective downstream logic.

8. The serial bus hub of claim 1, wherein in a first configuration, the first upstream logic is configured to connect to a first subset of downstream logics and the second upstream logic is configured to connect to a second subset of downstream logics, wherein in a second configuration, the first upstream logic is operable to connect to a third subset of downstream logics and the second upstream logic is operable to connect to a fourth subset of downstream logics, wherein the third subset is different than the first and second subsets, and wherein the fourth subset is different than the first and second subsets.

9. The serial bus hub of claim 8, wherein the first and second subsets and the third and fourth subsets overlap.

10. The serial bus hub of claim 1,
wherein each of the plurality of downstream logics are associated with a port of the plurality of ports, and wherein the serial bus hub is further configured to switch the first upstream logic and downstream logic between the first port and the respective port associated with the downstream logic.

11. The serial bus hub of claim 1, wherein the serial bus hub is comprised in a peripheral device.

12. The serial bus hub of claim 11, wherein a plurality of devices is coupled to the plurality of ports, wherein a subset of the plurality of devices comprise one or more of:
one or more devices internal to the peripheral device; and
one or more devices external to the peripheral device.

13. The serial bus hub of claim 1, wherein the serial bus hub is comprised in a cell phone.

14. The serial bus hub of claim 1, wherein the serial bus hub is comprised in a portable music player device.

15. The serial bus hub of claim 1, wherein the serial bus hub is comprised in an external housing, and wherein the serial bus hub is configured to attach to a system as a first device of the plurality of devices to provide serial bus communication between the system and the plurality of devices.

16. The serial bus hub of claim 1, wherein the plurality of devices comprises one or more of:
one or more cell phones;
one or more portable music player devices;
one or more computers;
one or more printers;

one or more hard-drives;
one or more digital cameras;
one or more memory mediums;
one or more audio devices;
one or more keyboards;
one or more mice;
one or more joysticks;
one or more uninterrupted power supplies (UPS);
one or more additional serial bus hubs;
one or more Ethernet devices;
one or more Bluetooth devices;
one or more storage devices;
one or more video devices; and
one or more communication converter devices.

17. The serial hub of claim 1, wherein the serial bus hub comprises a Universal Serial Bus (USB) 2.0 hub.

18. A serial bus hub, comprising:
a plurality of ports configured to couple to a plurality of devices, wherein a first port is coupled to first upstream logic for controlling a first subset of devices and a second port is coupled to second upstream logic for controlling a second subset of devices; and
switching logic configured to perform port reversal by coupling a third port of the plurality of ports to the first upstream logic for controlling the first subset of devices, wherein before switching, the third port is coupled to downstream logic and the first port is coupled to the upstream logic, and wherein after switching, the upstream logic is no longer coupled to the first port and the downstream logic is no longer coupled to the third port;
wherein the switching logic is further configured to change the configuration of the serial bus hub to change members of the first subset of devices and/or the second subset of devices.

19. The serial bus hub of claim 18,
wherein the switching logic is further configured to perform port reversal for any two respective ports of the plurality of ports.

20. The serial bus hub of claim 18,
wherein the serial bus hub is comprised in a peripheral device.

21. The serial bus hub of claim 18,
wherein the switching logic is further configured to:
automatically detect a switching condition with respect to the upstream logic and/or the downstream logic; and
switch the upstream logic and/or the downstream logic in response to the automatic detection.

22. The serial bus hub of claim 18,
wherein the serial bus hub is comprised in an external housing, and wherein the serial bus hub is configured to attach to a system as a first device of the plurality of devices to provide serial bus communication between the system and the plurality of devices.

23. The serial bus hub of claim 18, wherein the plurality of devices comprises one or more of:
one or more cell phones;
one or more portable music player devices;
one or more computers;
one or more printers;
one or more hard-drives;
one or more digital cameras;
one or more memory mediums;
one or more audio devices;
one or more keyboards;
one or more mice;
one or more joysticks;
one or more uninterrupted power supplies (UPS);
one or more additional serial bus hubs;
one or more Ethernet devices;
one or more Bluetooth devices;
one or more storage devices;
one or more video devices; and
one or more communication converter devices.

24. The serial bus hub of claim 18,
wherein the serial bus hub is a root serial bus hub.

25. The serial hub of claim 18, wherein the serial bus hub comprises a Universal Serial Bus (USB) 2.0 hub.

26. A method, comprising:
receiving input to a serial bus hub, wherein the serial bus hub comprises a plurality of ports for connecting to a plurality of devices, and wherein the input specifies a change in control of at least a subset of the plurality of devices by a first device coupled to a first port to control of the at least a subset of the plurality of devices by a second device coupled to a second port, wherein, prior to the input, the first device is configured to act as a host controller for the second device;
switching upstream logic from the first port to the second port, wherein after said switching, the second device is configured to act as the host controller for the first device;
wherein the serial bus hub further comprises one or more additional upstream logics coupled to one or more respective ports of the plurality of ports, and wherein the serial bus hub allows a plurality of host controllers to control respective subsets of the plurality of devices;
changing the configuration of the serial bus hub to allow the plurality of host controllers to control other respective subsets of the plurality of devices.

27. The method of claim 26, wherein the serial bus hub comprises a Universal Serial Bus (USB) 2.0 hub.

28. The method of claim 26, wherein said switching the upstream logic comprises:
decoupling the upstream logic from the first port;
decoupling downstream logic for sending and receiving information to and from the second device via the second port as a serial bus device; and
coupling the upstream logic to the second port.

29. The method of claim 28, further comprising:
coupling the downstream logic to the first port for sending and receiving information to and from the first device via the first port as the serial bus device.

30. The method of claim 26,
wherein the serial bus hub is comprised in a peripheral device.

31. The method of claim 26, further comprising:
automatically detecting a switching condition with respect to the upstream logic; and
wherein said switching the upstream logic is performed in response to the automatic detection.

32. The method of claim 26,
wherein the serial bus hub is an external serial bus hub.

33. The method of claim 26, wherein the plurality of devices comprise one or more of:
one or more cell phones;
one or more portable music player devices;
one or more computers;
one or more printers;
one or more hard-drives;
one or more digital cameras;

one or more memory mediums;
one or more audio devices;
one or more keyboards;
one or more mice;
one or more joysticks;
one or more Uninterrupted Power Supplies (UPS);
one or more additional serial bus hubs;
one or more Ethernet devices;
one or more Bluetooth devices;
one or more storage devices;
one or more video devices; and
one or more communication converter devices.

34. The method of claim 26, wherein the method further comprises:
switching one of the one or more additional upstream logics and/or the upstream logic with a downstream logic to change control relationships among the plurality of devices.

35. A serial bus hub, comprising:
upstream logic for sending and receiving information to and from a host controller;
downstream logic for sending and receiving information to and from a serial bus device;
a plurality of ports configured to couple to a plurality of devices, including a first port of the plurality of ports coupled to the upstream logic, and a second port of the plurality of ports coupled to the downstream logic; and
switching logic configured to switch the upstream logic and the downstream logic with respect to the first port and the second port respectively, and wherein the switching logic is configured to switch the upstream logic and/or the downstream logic in response to a user invoked switching condition received after the serial bus device is coupled to the downstream logic.

* * * * *